INVENTOR
MILTON V. SCOZZAFAVA

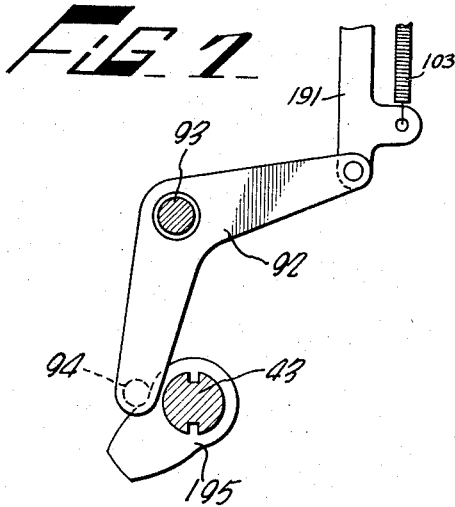
FIG. 7
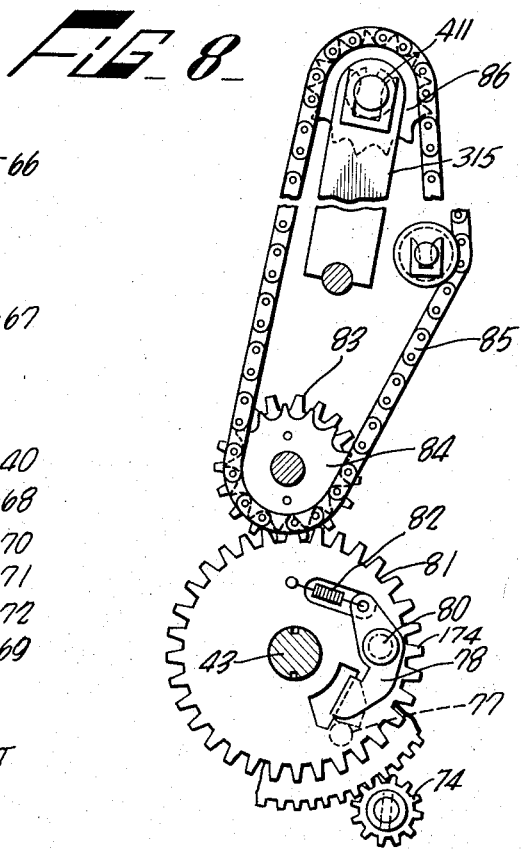
FIG. 8
FIG. 9
INVENTOR.
MILTON V. SCOZZAFAVA
BY
ATTORNEY.

3,362,516
VARIABLE LINE SPACING MECHANISM
Milton V. Scozzafava, San Gabriel, Calif., assignor to
 Clary Corporation, San Gabriel, Calif., a corporation
 of California
Continuation of application Ser. No. 336,790, Jan. 9,
 1964. This application July 19, 1966, Ser. No. 566,391
4 Claims. (Cl. 197—114)

ABSTRACT OF THE DISCLOSURE

An adding-listing machine for printing data on pre-printed forms in which each form is advanced to different line printing positions depending jointly upon the particular type of data to be printed and the particular print line at which the form is currently located.

---

This invention is a continuation of my copending application Ser. No. 336,790, filed on Jan. 9, 1964, for Variable Line Spacing Mechanism.

This invention relates to variable line spacing mechanism for business machines and the like, such as cash registering machines, accounting machines, etc.

In order to facilitate preparation of records, bills, statement slips and the like my machine, it has become common practice to print items on pre-printed forms which are inserted in the machine and advanced past the printing mechanism.

Such forms may have printed vertical column headings and horizontal line headings which are reserved for certain information such as, for example, a customer's number. Such pre-printed forms may take many variant forms depending upon the type and amount of information to be printed.

Normally, because of limitations in the design of the line spacing mechanism of the machine, the forms are so designed that after a form is fed into its first printing line position, it is merely automatically line spaced thereafter a fixed amount as an incident to each entry operation. However, this may impose a severe limitation in the design of the form and in the sequence of operation of the machine or it may require manual line spacing operations where lines are to be skipped or where column headings or the like are pre-printed. This manual spacing of the forms to appropriate lines has been found to be time consuming and subject to error due, for example, to forgetfulness on the part of the operator.

It therefore becomes a principal object of the present invention to overcome the above noted problems.

Another object is to automatically control line spacing in a predetermined manner.

Another object is to automatically line space record material different amounts in accordance with the type of entries.

Another object is to automatically control line spacing jointly in accordance with the position of a pre-printed record form relative to the printing mechanism and in accordance with different items entered in the machine.

Another object is to automatically control line spacing pre-determined manner and to modify such pattern under control of certain machine control keys.

The manner in which the above and other objects of the invention are accomplished will be readily understood on reference to the following specification when read in conjunction with the accompanying drawings, wherein:

FIG. 7 is a sectional elevational view illustrating the means for operating the line spacing pawl.

FIG. 8 is a sectional elevational view illustrating part of the form feeding mechanism.

FIG. 9 illustrates a sample paper tape including two pre-printed forms having items printed thereon by the machine.

FIG. 10 is a side view of the drive means for the actuating mechanism.

Figure 1:
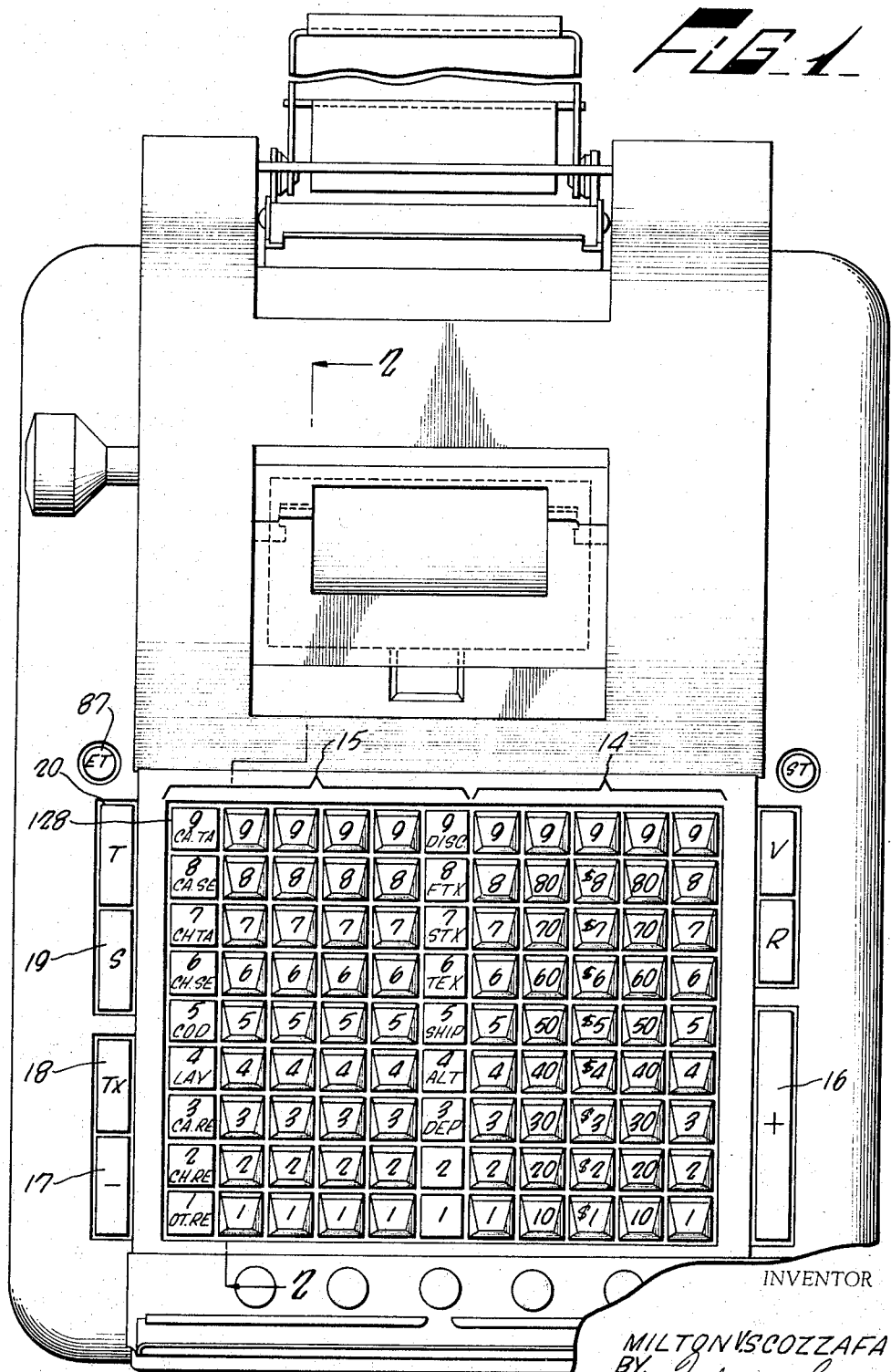
FIG. 1 is a plan view of a machine embodying a preferred form of the present invention.

The invention is illustrated as embodied in a sales transaction machine shown generally in FIG. 1 which embodies mechanism basically similar to that disclosed and claimed in the Scozzafava et al. Patent No. 3,017,081, issued on Jan. 16, 1962. Accordingly, reference may be had to such patent for details of construction of the basic portions of the machine which are not disclosed herein. However, it is to be understood that the invention is not limited to embodiment in the particular type of machine referred to.

Figure 2:
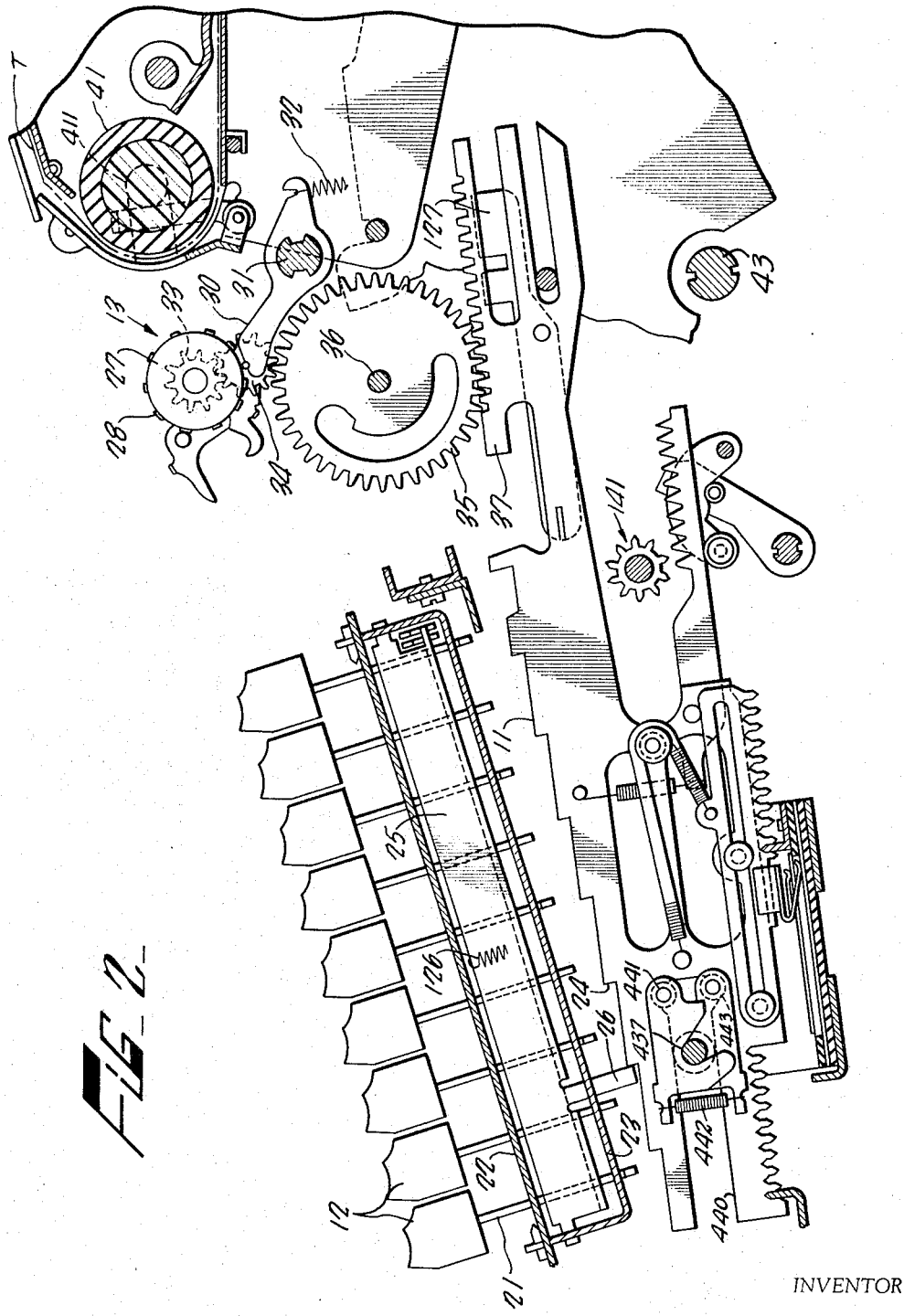
FIG. 2 is a longitudinal sectional view through the machine, with parts removed, and is taken substantially along the line 2—2 of FIG. 1.

The machine is of the full keyboard, rack driven type and comprises a plurality of denominationally arranged actuator racks 11, FIG. 2, each rack being differentially controlled by a row of nine amount keys 12. The racks are operatively associated with respective denominational orders of a printing section generally indicated at 13 and an accumulator section generally indicated at 141.

The keyboard is divided generally into two sections, the righthand section 14 including five rows of amount keys for principally entering the monetary amount of a sales transaction, and the left hand section 15 including six rows of keys for entering various identification matter pertaining to a sales transaction. However, during certain entries, the righthand section may be used to enter identification matter and during other entries both sections may be used to enter certain other identification matter.

Depressible conrol bars for initiating operation of the machine and for controlling the machine in appropriate manners include an add bar 16, subtract bar 17, tax entry bar 18, subtotal bar 19 and total bar 20.

Describing now the details of the machine, each of the amount keys 12 includes a key stem 21 guided for vertical movement in aligned slots formed in keyboard frame plates 22 and 23. The lower edges of the key stems cooperate with spaced shoulders 24 formed on the aligned racks 11 to limit the forward advancement of each rack (to the left in FIG. 2) to a number of increments corresponding to the numerical value of the key depressed in the associated row.

Spring means (not shown) are provided for normally holding the keys in their raised positions and means are further provided for latching each key in rack arresting position upon depression thereof. For the latter purpose, each key has a cam lobe (not shown) which is engageable by a locking bail 25, there being one such bail associated with each key row. Each bail is pivotally supported at its opposite ends. As a key is depressed, its cam lobe will move past the locking bail and as the lobe passes below such bail, the latter will be retracted partly by a spring 126 to a position wherein it latches the key in rack arresting position.

A zero block 26 depends from each blocking bail 25 and, when no key in the associated row is depressed, the bail will locate the zero block 26 directly in front of one of the shoulders 24, thereby preventing forward movement of the rack during a subsequent cycle of the machine. However, when any amount key is depressed and latched down, its locking bail 25 will be held outwardly sufficiently to maintain its zero block 26 out of the path of the aligned rack.

Each of the racks 11 is operatively entrained with a respective one of a series of numeral printing wheels 27 forming part of the printer 13. Each printer wheel is provided with a series of type characters 28 spaced therearound and advancing in value from zero to nine. Each printer wheel is rotatably mounted on a respective arm 30 which is loosely keyed on a printer control shaft 31 and spring urged clockwise by a tension spring 32. A gear 33 integral with each printer wheel is maintained in continual mesh with an idler gear 34 also rotatably carried by the arm 30.

Except during printing operations, the arms 30 are held in their positions illustrated in FIG. 2 by the shaft 31, in which positions the idler gears 34 mesh with associated idler gears 35 journalled on a fixed shaft 36. The latter idler gears continually mesh with offset rack sections 37 integral with respective ones of the racks 11.

At approximately 180 degrees in the rotation of a primary, cyclically operable clutch 42 (FIG. 3) to be further described later, and after the various racks 11 have been advanced to different positions limited by depressed ones of amount keys 12, the shaft 31 is rocked clockwise, allowing the springs 32 to likewise rock the arms 30 (if otherwise allowed to do so), causing the printing wheels 27 which have been set to represent numerical values corresponding to the particular keys depressed, to move into printing contact with a printing ribbon (not shown) and a paper strip T as the strip passes over a rotatable platen 41. The strip comprises a series of pre-printed forms, i.e. 38 and 40, FIG. 9, arranged in end-to-end manner.

After printing is effected, the arms 30 are returned to their normal positions by the shaft 31 and the racks are subsequently returned to their illustrated home positions.

Figures 3, 4:
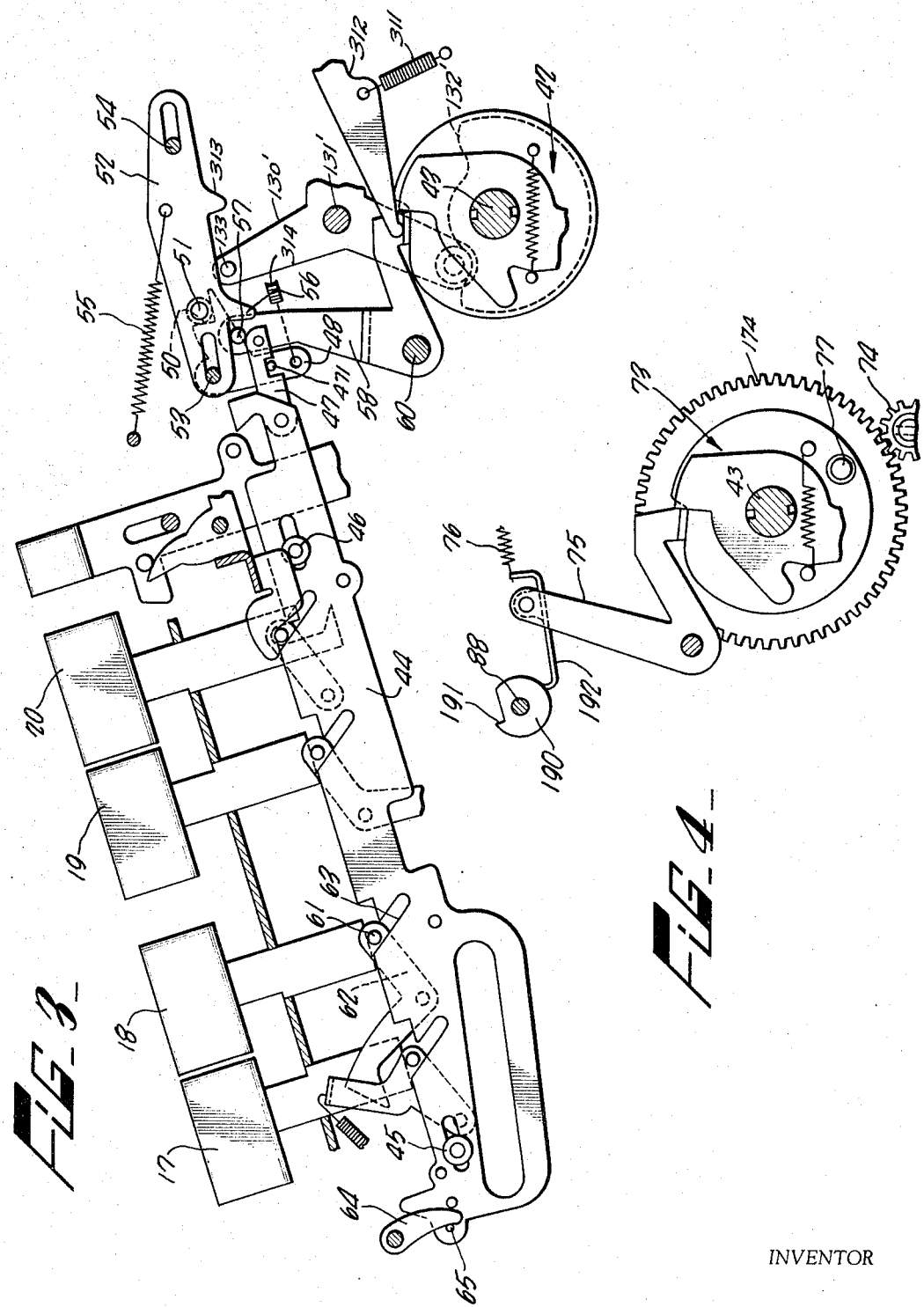
FIG. 3 is a sectional elevational view of the primary machine clutch and its controls.
FIG. 4 is a sectional elevational view of the auxiliary paper feed clutch.

Describing now the means for driving the various operating parts of the machine, such as the racks 11, the machine is driven by a motor (not shown) through a primary cyclically operable clutch 42, FIG. 3, having its output side attached to a rotatable cam shaft 43. The clutch is effective during each cycle of operation to cause a complete rotation of the shaft 43 in a counterclockwise direction.

During each cycle of operation the racks 11 are yieldably advanced to the left (FIG. 2) and then returned by the shaft 43 through the mechanism illustrated in FIG. 10. For this purpose, cams 431 keyed on the shaft 43 oscillate a cam follower 432 fulcrumed at 433 to reciprocate a link 434 connected to one of a pair of bifurcated arms 435 fastened to a rockable shaft 436. Such arms embrace the opposite ends of the rack support and drive rod 437 which are guided for lateral movement in guide slots 438 in side frame plates 439 and are slideably embraced by elongated slots 440 in the racks 11. Pairs of drive elements 441 are pivotally supported by the shaft 437. Each element 441 of a pair is urged outwardly by a tension spring 442 to yieldably engage a notch 443 in the respective rack and thus form a yieldable driving connection. When a rack is arrested by a depressed one of the keys 12, the drive elements will ride out of such notches and move along the slot 440. However, during the return movement of the shaft 437 the drive elements will re-engage the notches 443 to reconstitute the yieldable driving connection between the shaft and the rack.

The machine is controlled for different operations by depressing appropriate ones of the aforementioned machine control bars, each of which is effective to cause engagement of the clutch 42 to effect one revolution of the latter and a corresponding cycle of operation of the machine. The means for controlling the clutch under the influence of certain of the control keys is shown in FIG. 3.

A clutch control slide 44 is formed with slots guided over stationary frame pins 45 and 46. The control slide is connected by a hook 47 to a pin 471, on a trigger arm 48. The latter is normally held in its illustrated position by a spring 314 and is provided with a latching shoulder 50 normally aligned directly in front of a roller 51 carried by a power slide 52. The slide is provided with elongated slots embracing frame pins 53 and 54.

When the clutch control slide is moved to the left, as will be described presently, under control of any of the machine control bars, it will rock the trigger arm 48 about the frame pin 53, thus releasing the power slide 52 to the action of a relatively strong tension spring 55. The slide 52 is accordingly impelled to the left, causing a shoulder 56 thereon to engage a pin 57 on a clutch control dog 58. The latter is accordingly rocked counterclockwise about a pivot pin 60 and against the pull of a spring 311 acting thereagainst through a freely movable arm 312 to effect engagement of the clutch 42. The details and function of the clutch 42 may be determined by reference to the patent to R. E. Boyden 2,515,692, issued on July 18, 1952.

Pins, like pin 61, are located directly below the stems of the various control bars, 17, 18, 19 and 20, and are carried by pivotally supported arms, like arm 62, which are urged counterclockwise into their illusrtated positions by springs (not shown) to normally hold the control bars in their raised positions. The pins 61 are located directly above inclined slots, like slot 63, in the clutch control slide, whereby depression of any of the control bars 17 to 20 will move the clutch control slide to the left to cause engagement of the primary clutch 42.

The add bar 16 is likewise effective to actuate the clutch control bar, and for this purpose, means not shown, is operable upon depression of the add bar to rock an arm 64 clockwise, causing the same to engage a pin 65 on the clutch control slide 44 to move the same leftward in clutch engaging position.

The various pre-printed forms, i.e. 38 and 40, FIG. 9, are all of equal length and are defined by scored lines 66 which facilitate separating of the forms. Each form includes a heading 67 comprising the store name, customer's name and address, etc. Therebelow is a horizontal line of column headings 68 for designating the identity of items, such as the date, to be printed in a line 70. Below line 70 is a second line for the customer's number, and below this is another line 72 of column headings. The various items of a transaction are listed below the heading 72 and these will obviously vary in number for different transactions.

Describing now the means for advancing the strip T to register a new form in position for recording the items of a new transaction, a second cylically operable clutch 73 (FIG. 4) is provided. The latter is rotatably mounted on the shaft 43 but has no connection therewith. The input side of the clutch is driven by the motor through gears 74 and 174 (FIGS. 4 and 8). The clutch is controlled by a clutch dog 75, normally held in its illustrated clutch dis-engaging position by a tension spring 76.

The output side of the clutch 73 carries a stud 77 (see also FIG. 8) which normally lies in front of an ear on the bypass pawl 78 which is pivoted at 80 on a gear 81 and is yieldably held in its illustrated position by a spring 82 tensioned between the pawl and the gear.

The gear 81 is freely mounted on the shaft 43 and meshes with a gear 83 carrying a chain sprocket 84. The latter drives an endless chain 85 which, in turn, drives a sprocket 86 located coaxially of the platen 41 and operatively connected thereto by shaft 411 which is supported at one end by a brace, partly shown at 315.

As will be described presently, a preceding form, i.e. 38, may have been line spaced different amounts, depending on the number of items involved in the transaction. During such advancement of the platen 41, the gear 81 which is entrained therewith, will have likewise advanced different amounts relative to the stud 77. Now, at the end of a transaction operation an end-of-transaction key 87 (FIG. 1) is depressed, causing, among other things, clockwise rotation of a shaft 88 (FIG. 4) as set forth in detail in the aforesaid patent 3,017,081. The latter carries a disc 190 having a shoulder 191 thereon which engages an arm 192 on the clutch dog 75 to cause engagement of the form feeding clutch 73. The latter clutch is similar in construction and function to the primary clutch 42.

As the disc 190 continues its clockwise rotation, the shoulder passes out of engagement with the arm 92, permitting the clutch dog to ride on the outer periphery of the clutch 73 and thus cause disengagement of the clutch when it completes one revolution or one cycle. During such rotation of the clutch the stud on the latter will move idly until it picks up the pawl 78 to advance the gear 81 and the platen through the remainder of the clutch cycle whereupon the line 70 of the new form will be located at a printing line to receive a print from the printing mechanism.

Describing now the means for line spacing the forms various amounts to properly print the items of a transaction is appropriate locations relative to the various column headings, etc., a ratchet wheel 90 (FIGS. 5 and 6) is suitably attached to shaft 411 connected to the platen 41 and is adapted to be advanced by a line spacing pawl 91 in increments of 1, 2 or 3 line spaces as an incident to each cycle of operation of the machine. The pawl 91 is pivotally supported by a bell crank 92, FIG. 7, fulcrumed at 93 and carrying a roller 94 which engages a line spacing cam 195 fixed on the drive shaft 43.

A line space control member 96 is pivotally supported on a bearing bushing 197 which also supports the shaft of the platen 41. The member 96 is normally held in its position shown in FIG. 5 by a centralizer arm 97 fulcrumed at 95 and urged counterclockwise by tension spring 100 to engage one of three notches 101 formed on the member 96. In such position, the edge 102 of the member 96 guides the pawl 91 against the action of a tension spring 103, to engage and advance the ratchet wheel and platen a single line space.

The control member 96 is pivotally connected to a link 104 having a pin and slot connection 105 to a bell crank 106 fulcrumed at 107, the pin being freely slideable in the slot. The bell crank 106 is connected by a link 108 to a cam follower 110 fulcrumed at 111 and carrying a roller 112 in engagement with a control cam 113 fixed on the drive shaft 43.

Figure 6:
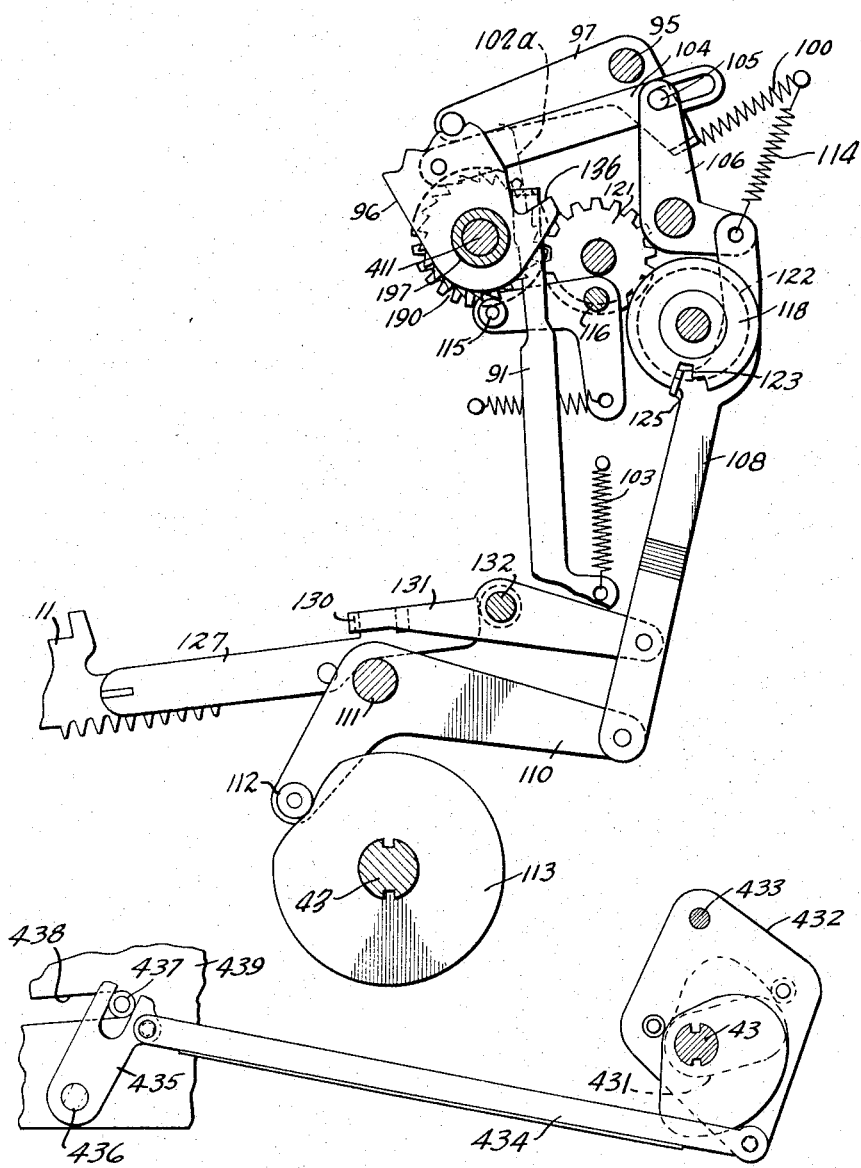
FIG. 6 is a view similar to FIG. 5 but illustrating the line spacing control mechanism partly through a machine cycle.

The control member 96 is urged toward its counterclockwise rocked position shown in FIG. 6 by a tension spring 114 extending between the bell crank 106 and a part on the machine frame but is normally prevented from moving to such position by the cam 113 which has a concentric high portion extending around the major portion of its periphery and engaging the roller 112 when in full cycle position.

The control member 96 is settable into its counterclockwise rocked position in a manner to be described presently, and in this position its edge 102 guides the pawl 91 in a path wherein it is effective to engage and drive the ratchet 90 an increment of three line spaces. The control member is also settable in an intermediate position wherein its guide edge 102 assumes the position shown in dot-dash lines 102a to guide the pawl 91 in a path wherein it will advance the ratchet an increment of two line spaces.

A centralizer lever 115 is fulcrumed at 116 and is urged clockwise by tension spring 117 to yieldably maintain the ratchet and platen in any line printing position to which they are advanced.

Means are provided under joint control of the keyboard and the platen to appropriately set the control member so that the form being printed will be line spaced to properly locate the data being printed in relation to the pre-printed format.

Figure 5:
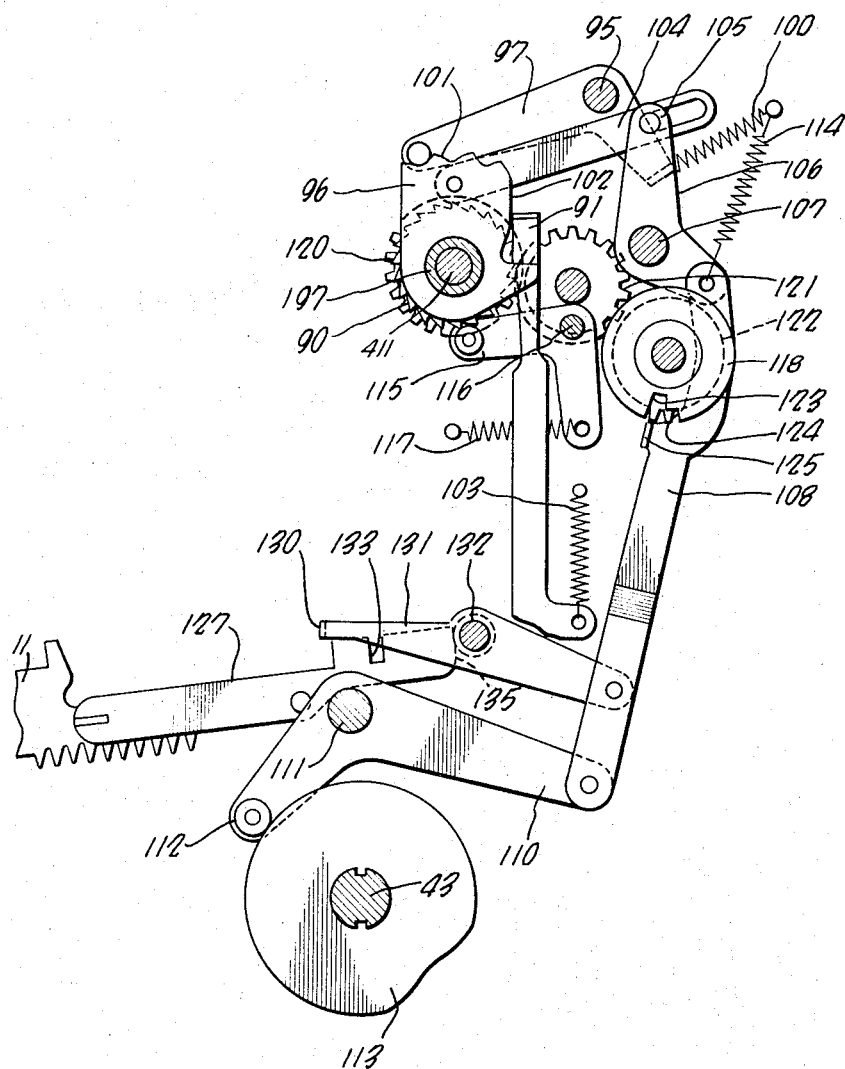
FIG. 5 is a sectional elevational view through the variable line spacing control mechanism and is illustrated in full cycle position.

Referring to FIGS. 5 and 6, the ratchet 90 is entrained with a notched disc 118 through gears 120, 121 and 122. The gears 120 and 122 are of the same diameter so as to rotate the disc 118 in synchronism with the platen.

It will be noted that the disc 118 has a notch 123 therein of full depth and a second notch 124 of one-half depth. The notch 124 is angularly spaced from the notch 123 by an amount equal to the distance between two adjacent printed lines on the forms 38 and 40 so that the disc 118 is advanced to remove one notch from cooperative alignment with the sensing ear 125 on link 108 and the other notch into cooperative alignment with such ear while the forms are advanced from one line position to a next.

When the notch 123 is aligned with the ear 125, it will permit the link 108 to rise (if otherwise allowed to do so) to its full extent, as shown in FIG. 6, to thereby set the control member 96 in position to effect a triple line spacing. However, when the notch 124 is aligned with the ear 125, it will permit the link 108 to rise only sufficiently to set the control member 96 in its intermediate position to effect a double line spacing.

A notched control plate 127, FIGS. 2, 5 and 6, is attached to the rack 11 which is controlled by the lefthand row 128 of keys on the keyboard. The plate 127 is arranged to block a sensing ear 130 formed on a lever 131 fulcrumed at 132 and pivotally connected to the link 108. When the high portions or lands of the plate 127 are located under the ear 130, which occurs when the rack 11 is moved to its 1, 2, 4, 5, 6 or 7 numerical position, the link 108 will be prevented from rising and accordingly the control member 96 will be held in its single line spacing control position regardless of the angular position of the disc 118. Thus, when no key has been depressed in the lefthand row 128 (in which case the rack will be retained in its home illustrated position), or when the rack 11 is advanced to present a notch 133 in plate 127 in alignment with ear 130, the link 108 is allowed to rise a full amount, if otherwise allowed to do so by the disc 118, to set the control member 96 to its triple line spacing control position.

Describing now the operation of the machine when printing data on the pre-printed forms shown in FIG. 9, and considering a cash sales transaction in which the customer is to take his merchandise with him, the printing will follow the format shown in form 38. The operator first enters his employee number on the keyboard and depresses the number 9 or "Cash-Take" key in the lefthand row 128 of the keyboard. He then depresses the "add" bar 16 and in the ensuing machine operation, the date, employee's number, and other data is printed on the print line 70 of the form 38. Suitable means (not shown) prevents the employee's number from being entered into the accumulator. Since the transaction is a "Cash-Take" operation, the rack 11 carrying the plate 127 will be advanced to its fullest extent wherein the rear edge 135 of the plate is moved to a position located to the left of the ear 130 of the lever 131. Accordingly, since the notch 123 is now aligned with ear 125 of the control link 108, the spring 114 becomes effective at approximately 180° in the cycle to set the line space control member 96 into its triple line space control position of FIG. 6. Thereafter, at approximately 310° in the cycle, the line spacing cam 195, FIG. 7, actuates the pawl 91 to advance the paper strip three line spaces, locating the first data printing line 69 of the form 38 in printing line position directly below the column heading line 72. During its downward movement, the pawl 91 will engage a shoulder 136 on the line space control member 96 to return the latter to its single line space control position shown in FIG. 5.

Due to the triple line spacing of the platen, the disc 118 is rotated clockwise to present the concentric high portion of the periphery thereof to the ear 125 of the link 108 to thereafter limit line spacing to single line spacing increments only.

Considering now, for example, a "Charge-Take" transaction, the printing will follow the format shown in form 40. The operator first enters his employee number and depresses the number 7 or "Charge-Take" key in the lefthand key row. He then depresses the "add" bar to print such item, along with the date, etc. on the line 70 of form 40. In this operation, the plate 127 will be moved to a position to prevent movement of the line spacing control member 96 out of its single line space control position shown in FIG. 5. Accordingly, the strip T will be advanced a single space only to position the line 71 in position to receive a subsequent print. Toward the end of such cycle, the various latch bars 25 are operated in a manner not shown to release all depressed keys so that the lefthand row will no longer effect control of line spacing. The operator now enters the customer's number in the keyboard and again depresses the "add" bar 16 to enter and imprint such number on line 71. During the second cycle of the machine, it will be noted that the notch 124 in the control disc 118 will be located in alignment with the ear 125 of link 108. Accordingly, the link will be allowed to rise sufficiently to move the line space control member 96 to its intermediate or double line space control position. Accordingly, during the ensuing line spacing operation, the form 40 will be double line spaced to locate the first data printing line 69 in print receiving position. Thereafter, the concentric portion of the periphery of control disc 118 will be presented to the ear 125 to effect single line spacing as an incident to entry of subsequent items.

It will be noted that the disc 118 and control plate 127 can be formed with notches of different depths and in different locations to control line spacing of the paper strip in accordance with pre-printed forms of different formats. The power slide 52 is returned to its position shown in FIG. 3 during the mid-portion of each machine cycle and, for this purpose, a cam follower 130' is pivotally supported at 131' and is rocked clockwise by a cam 132' on the shaft 43, causing a pin 133 thereon to engage a portion 313 of the power slide 52 to return the same to the right until it is again latched by the trigger arm 48.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. A machine of the class described comprising a printing mechanism for printing items on a record medium,
    differential actuating mechanism for said printing mechanism,
    a notched control member operatively connected to said differential actuating mechanism,
    a first sensing device for said control member,
    mechanism for feeding said record medium relative to said printing mechanism,
    means including a notched control disc operatively connected to said feeding mechanism,
    a second sensing device for said control disc,
    a ratchet operatively connected to said feeding mechanism,
    means including a pawl for advancing said ratchet whereby to advance said feeding mechanism;
    a guide member settable into any of different positions for controlling the extent of advancement of said ratchet by said pawl,
    means including said first and second sensing devices for moving said guide member from one of said positions to another, and
    means operable by said pawl as an incident to advancing said ratchet for returning said guide member to said one position.

2. A machine according to claim 1 wherein said means for moving said guide member comprises normally ineffective spring means; and
    means operable in advance of advancement of said ratchet by said pawl for rendering said spring means effective.

3. A machine of the class described comprising a printing mechanism for printing items on a record medium,
    differential actuating mechanism for said printing mechanism,
    a first control member movable into any of different positions by said actuating mechanism,
    said member having a first irregular control surface,
    mechanism for feeding said record medium relative to said printing mechanism,
    a second control member successively movable into different positions by said feeding mechanism,
    said second member having a second irregular control surface,
    line spacing mechanism for actuating said feeding mechanism various amounts,
    means for operating said line spacing mechanism,
    a first sensing device for said first irregular surface,
    a second sensing device for said second irregular surface,
    means controlled jointly by said first and second sensing devices for controlling said line spacing mechanism to successively advance said feeding mechanism different amounts, said jointly controlled means comprising normally ineffective spring means for actuating said sensing devices,
    cyclically operable means for advancing said actuating mechanism, and
    means operable by said cyclically operable means for rendering said spring means effective after advancement of said actuating mechanism.

4. A machine according to claim 3 wherein said jointly controlled means comprises a third control member settable into any of a plurality of different positions to control the extent of advancement of said feeding mechanism different amounts, and
    means operable as an incident to advancement of said feeding mechanism by said line spacing mechanism for invariably setting said third control member in a predetermined one of said positions thereof.

(References on following page)

References Cited

UNITED STATES PATENTS

| | | | |
|---|---|---|---|
| 2,022,823 | 12/1935 | Racz. | |
| 2,247,170 | 6/1941 | Hagelin | 197—4 |
| 2,351,541 | 6/1944 | Placke | 197—133 X |
| 2,797,791 | 7/1957 | Kuhne | 197—114 |
| 2,800,073 | 7/1957 | Block | 197—133 X |
| 2,806,692 | 9/1957 | Stimson et al. | 197—133 X |
| 2,917,153 | 12/1959 | Westover | 197—133 |
| 2,919,783 | 1/1960 | Stimson | 197—133 |
| 2,952,349 | 9/1960 | Nessel et al. | 197—127 |
| 2,969,135 | 1/1961 | Feliu | 197—133 X |
| 2,981,396 | 4/1961 | Lane | 197—133 |
| 2,983,355 | 5/1961 | Taperell | 197—133 |
| 3,005,534 | 10/1961 | Morris | 197—114 |
| 3,019,881 | 2/1962 | Cetran et al. | 197—114 |
| 3,197,012 | 7/1965 | Lambert | 197—114 |

ROBERT E. PULFREY, *Primary Examiner.*

E. T. WRIGHT, *Assistant Examiner.*